(12) United States Patent  
Yasuhara

(10) Patent No.: US 12,409,899 B1
(45) Date of Patent: Sep. 9, 2025

(54) VEHICLE

(71) Applicant: KAWASAKI MOTORS, LTD., Akashi (JP)

(72) Inventor: Hidefumi Yasuhara, Akashi (JP)

(73) Assignee: Kawasaki Motors, Ltd., Akashi (JP)

( * ) Notice: Subject to any disclaimer, the term of this patent is extended or adjusted under 35 U.S.C. 154(b) by 0 days.

(21) Appl. No.: 18/739,691

(22) Filed: Jun. 11, 2024

(51) Int. Cl.
| B60J 5/10 | (2006.01) |
| B60G 17/017 | (2006.01) |
| B60R 5/04 | (2006.01) |
| B60R 21/13 | (2006.01) |
| B62D 43/00 | (2006.01) |
| B62D 43/06 | (2006.01) |
| E05F 3/04 | (2006.01) |

(52) U.S. Cl.
CPC ......... *B62D 43/002* (2013.01); *B60G 17/017* (2013.01); *B60J 5/107* (2013.01); *B60R 21/13* (2013.01); *B62D 43/06* (2013.01); *E05F 3/04* (2013.01); *B60G 2500/30* (2013.01); *B60G 2800/914* (2013.01); *B60R 5/04* (2013.01); *E05Y 2201/218* (2013.01); *E05Y 2900/548* (2013.01)

(58) Field of Classification Search
CPC .... B62D 43/002; B62D 43/06; B60G 17/017; B60G 2500/30; B60G 2800/914; B60J 5/107; E05F 3/04; B60R 5/04; B60R 21/13; E05Y 2201/218; E05Y 2900/548
See application file for complete search history.

(56) References Cited

U.S. PATENT DOCUMENTS

| 4,573,854 | A | * | 3/1986 | McFarland | .......... A61G 3/0209 |
| | | | | | 267/179 |
| 7,918,465 | B2 | * | 4/2011 | Metzger | ................. B60P 1/027 |
| | | | | | 280/439 |
| 8,322,772 | B1 | | 12/2012 | Gilbeck et al. | |
| 2020/0148047 | A1 | * | 5/2020 | Kay | ......................... B60R 5/04 |

FOREIGN PATENT DOCUMENTS

| CN | 115139721 A | * | 10/2022 | ......... B60G 17/0152 |
| DE | 102008056375 B4 | * | 7/2021 | ............. B60J 7/146 |
| EP | 1787613 A2 | * | 5/2007 | ............. A61G 3/061 |
| FR | 2911361 A1 | * | 7/2008 | ............. E05F 15/63 |

(Continued)

OTHER PUBLICATIONS

Chen, CN-115139721-A, Machine Translation of Specification (Year: 2022).*

(Continued)

*Primary Examiner* — Paul N Dickson
*Assistant Examiner* — Matthew Joseph Ganci
(74) *Attorney, Agent, or Firm* — BURR PATENT LAW, PLLC

(57) ABSTRACT

A vehicle includes: a vehicle body including an opening part located in a rear part of the vehicle; a hatch supported by the vehicle body so as to be able to open and close the opening part; an under hatch component located inside the vehicle with respect to the opening part; and a rack movably supported by the vehicle body between a first position facing the under-hatch component and a second position retracted from the first position. The under-hatch component is exposed outside through the opening part in a state where the hatch is opened and the rack is located in the second position.

16 Claims, 14 Drawing Sheets

(56) References Cited

FOREIGN PATENT DOCUMENTS

| KR | 100580004 B1 * | 5/2006 | ........... B62D 25/087 |
| WO | WO-8907569 A1 * | 8/1989 | |

OTHER PUBLICATIONS

Dakkuya, FR-2911361-A1, Machine Translation of Specification (Year: 2008).*
Bunsmann, DE-102008056375-B4, Machine Translation of Specification (Year: 2021).*
Jeongho, KR-100580004-B1, Machine Translation of Specification (Year: 2006).*
Pawl, WO-8097569-A1, Machine Translation of Specification (Year: 1989).*

* cited by examiner

VEHICLE

TECHNICAL FIELD

The present disclosure relates to a vehicle with a rack.

BACKGROUND ART

U.S. Pat. No. 8,322,772 BI discloses a vehicle with a cargo bed.

SUMMARY

The present vehicle is a vehicle including: a vehicle body including an opening part located in a rear part of the vehicle; a hatch supported by the vehicle body so as to be able to open and close the opening part; an under hatch component located inside the vehicle with respect to the opening part; and a rack movably supported by the vehicle body between a first position facing the under-hatch component and a second position retracted from the first position, wherein the under-hatch component is exposed outside through the opening part in a state where the hatch is opened and the rack is located in the second position.

According to the present vehicle, the rack is covered by the hatch, thus a stored object stored in the rack can be protected from rain water, for example. In a state where the hatch is closed and the rack is located in the first position, the under-hatch component can be protected by the rack and the hatch, and a stored object loaded on the rack can be protected by the hatch. Furthermore, in the state where the hatch is opened and the rack is located in the second position, it is easy to have access to the under-hatch component through the opening part.

The objects, features, aspects, and advantages of this disclosure will become more apparent from the following detailed description and the accompanying drawings.

DESCRIPTION OF THE PREFERRED EMBODIMENTS

Figure 1:
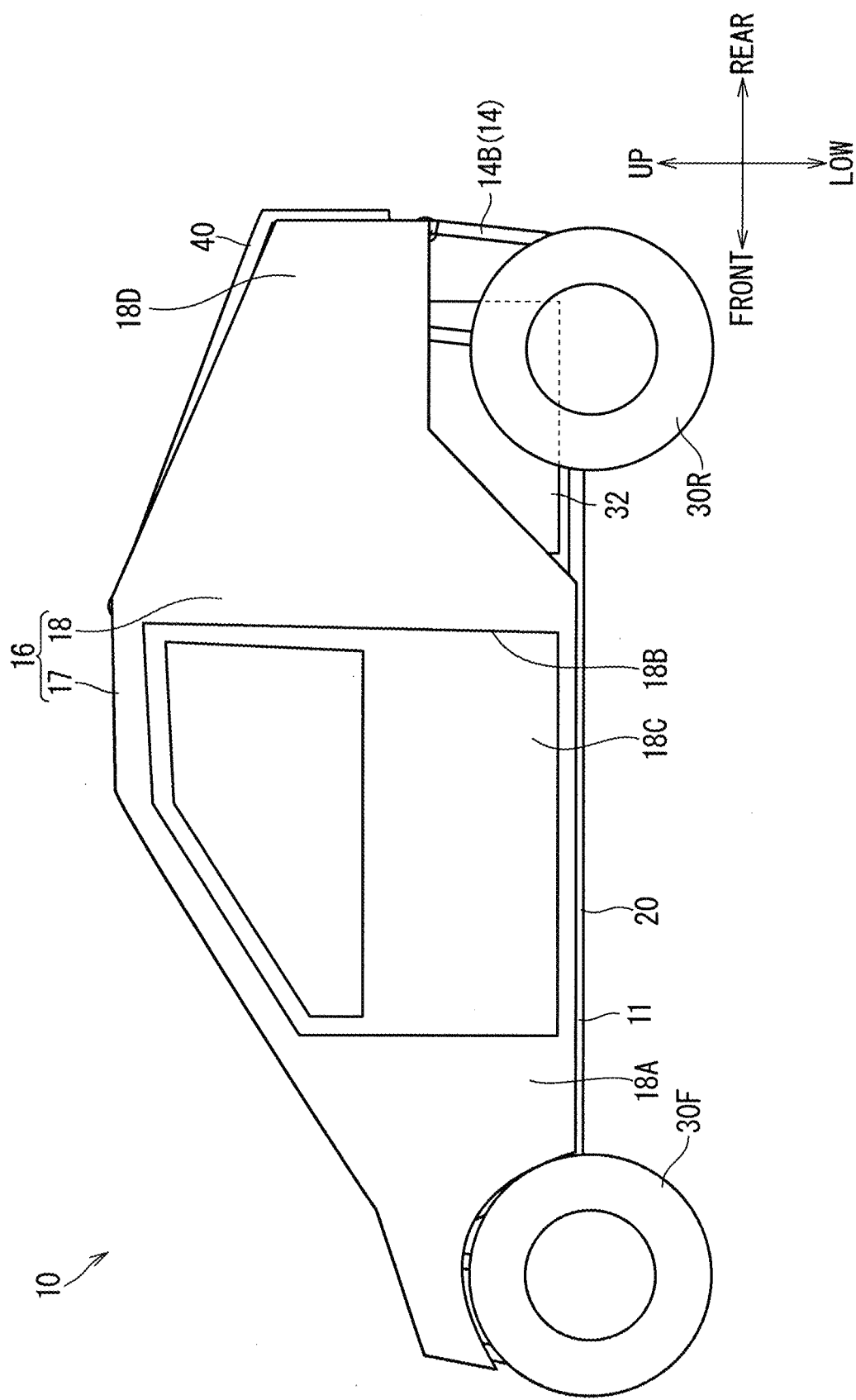
FIG. 1 is a side view illustrating a vehicle.
Figure 2:
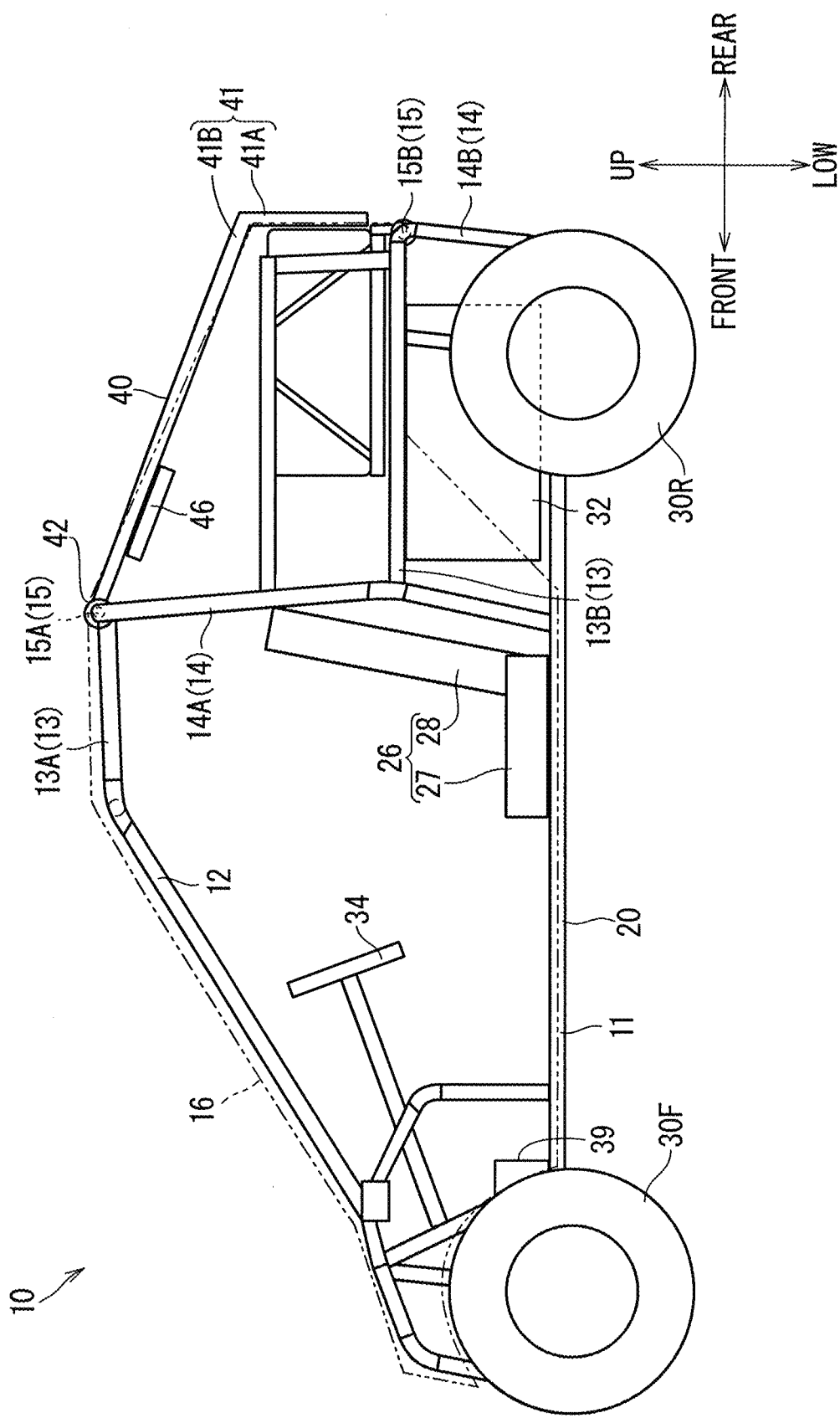
FIG. 2 is a side view illustrating an inner part of a hardtop in the vehicle.

A vehicle according to an embodiment will be hereinafter described. FIG. 1 is a side view illustrating a vehicle 10. FIG. 2 is a side view illustrating an inner part of a hardtop 16 in the vehicle 10. In the following description, a travel direction of the vehicle 10 may be expressed as FRONT, a direction opposite to the travel direction may be expressed as REAR, a road surface side on which the vehicle 10 travels may be expressed as LOW, and a side opposite to the road surface side may be expressed as UP. The RIGHT-LEFT may be referred to while a person stands on a road surface and faces forward. A right-left direction is a vehicle-width direction.

<Whole Configuration of Vehicle>

The vehicle 10 includes a vehicle body 11, a hatch 40, an under-hatch component 32, and a rack 50. In the present embodiment, the vehicle 10 further includes a seat 26, a travel mechanism, and a drive operation mechanism.

The vehicle body 11 includes an opening part 19 (refer to FIG. 6) located in a rear part of the vehicle 10. In the present embodiment, the vehicle body 11 includes a rollover protective structure (ROPS) 12, the hardtop 16, and a chassis 20. In the present embodiment, the opening part 19 is formed on an upper side of the rear part of the hardtop 16.

The ROPS 12 determines an occupant space. The ROPS 12 is formed by connecting a plurality of frame parts. A part of the plurality of frame parts located in front of the vehicle 10 determines an occupant space. A part of the plurality of frame parts located in back of the vehicle 10 determines a luggage space and a space for the under-hatch component 32. The plurality of frame parts include a lateral frame part 13 mainly extending in a front-back direction, a vertical frame part 14 mainly extending in a vertical direction, and a cross frame part 15 mainly extending in a right-left direction. Each of the lateral frame parts 13 and the vertical frame parts 14 is basically provided on right and left sides in a pair. The cross frame part 15 connects the pair of lateral frame parts 13 or the pair of vertical frame parts 14 to each other. In the right-left direction, the seat 26 and a steering wheel 34, for example, are located between the pair of lateral frame parts 13 and the pair of vertical frame parts 14.

In the example illustrated in FIG. 2, the lateral frame part 13 includes a lateral frame part 13A extending in the front-back direction on an upper side of the seat and a lateral frame part 13B extending in the front-back direction in back of the seat, for example. The vertical frame part 14 includes a vertical frame part 14A extending in an up-down direction in back of the seat and a vertical frame part 14B extending in the up-down direction in back of the vehicle 10, for example. The cross frame part 15 includes a cross frame part 15A in the right-left direction on the upper side of the seat and a cross frame part 15B extending in the right-left direction in back of the vehicle 10, for example.

A region between the plurality of frame parts in the ROPS 12 is opened. An opening between the plurality of frame parts in the ROPS 12 in the vehicle 10 may be appropriately covered by a cover, for example.

A member covering an opening in front of the seat 26 in the cover provided to the ROPS 12 can be considered a windshield. A member covering an opening on the upper side of the seat 26 in the cover provided to the ROPS 12 can be considered a roof. A member covering an opening on a lateral side of the seat 26 in the cover provided to the ROPS 12 can be considered a door 18C. A member covering an opening in back of the seat 26 in the cover provided to the ROPS 12 can be considered a partition wall 22. One or some of the windshield, the roof, the door 18C, and the partition wall 22 may be provided as the cover provided to the ROPS 12. When some of the windshield, the roof, the door 18C, and the partition wall 22 are provided as the cover, plural parts may be individually or integrally provided. Provided in the present embodiment is the hardtop 16 integrally including the windshield, the roof, the door 18C, and the partition wall 22 as the cover. In the present embodiment, a major part of the ROPS 12 is covered by the hardtop 16.

The hardtop 16 is made of metal or rigid resin, and has high rigidity. In the example in FIG. 1, the hardtop 16 includes a roof part 17 and a sidewall part 18. The roof part 17 is located on the upper side of the vehicle 10. The roof part 17 covers the upper side of the seat 26. The sidewall part 18 is located on both lateral sides of the vehicle 10. The sidewall part 18 includes a front sidewall part 18A and a rear sidewall part 18D.

The front sidewall part 18A is located on a lateral side of the seat. A ride opening part 18B is formed in the front sidewall part 18A. An occupant can get in and out of the vehicle 10 through the ride opening part 18B. Herein, the door 18C is attached to the ride opening part 18B. The door 18C can open and close the ride opening part 18B. The vehicle 10 may be configured to achieve normal traveling while the ride opening part 18B is not completely covered by the door 18C but remains open.

The rear sidewall part 18D extends to a rear side from the front sidewall part 18A. The rear sidewall part 18D protrudes from a part of the front sidewall part 18A along a height direction. A portion surrounded by upper edges of the pair of rear sidewall part 18D and a rear edge of the roof part 17 is the opening part 19 opened and closed by the hatch 40.

In the vehicle 10, each part (the seat 26, the ROPS 12, a travel drive source, 32, wheels 30F and 30R, for example) is supported by the chassis 20.

The hatch 40 is supported by the vehicle body 11 so as to be able to open and close the opening part 19. FIG. 1 illustrates a state where the hatch 40 is closed. The under-hatch component 32 is located inside the vehicle 10 with respect to the opening part 19. The rack 50 is movably supported by the vehicle body 11 between a first position and a second position. The first position is a position where the rack 50 faces the under-hatch component 32. The second position is a position retracted from the first position. In a state where the hatch 40 is opened and the rack 50 is located in the second position, the under-hatch component 32 is exposed outside through the opening part 19.

The seat 26 includes a seat cushion 27 in which an occupant is seated and a seat back 28 on which the occupant leans. The seat back 28 has a height high enough to support a back of the occupant seated in the seat 26. In the example illustrated in FIG. 2, the seat 26 is provided in only one row in the front-back direction. The seat 26 may be separately provided in two rows in the front-back direction, or may also be provided in three or more rows.

The travel mechanism is a mechanism for the vehicle 10 to travel, and includes the wheels 30F and 30R, a travel drive source 32, and a power transmission mechanism. Rotation drive force of the travel drive source 32 is transmitted to the wheels 30F and 30R through the power transmission mechanism, thus the vehicle 10 travels. Described in the present embodiment is an example that the vehicle 10 includes four wheels 30F and 30R. The vehicle 10 may include three wheels, or may also include six wheels. The configuration of the power transmission mechanism is discretionary. Examples of the power transmission mechanism may include a transmission and a drive shaft.

The wheels 30F and 30R include front wheels 30F and rear wheels 30R. Two front wheels 30F are rotatable around its own central axis and are supported to be rotatable around a steering axis at right and left front portions of the chassis 20. Two rear wheels 30R are supported to be rotatable around its own central axis at right and left rear portions of the chassis 20.

The travel drive source 32 may be an internal combustion engine that burns fuel in a combustion chamber and generates power for traveling through expansion of gases caused by burning. In this case, it is sufficient that the vehicle 10 includes a fuel tank. The travel drive source 32 may be an electric motor that converts electric energy into rotational motion for traveling. In this case, it is sufficient that the vehicle 10 includes a traveling battery for supplying the electric energy to the travel drive source 32. A position of the travel drive source 32 is discretionary. Herein, the travel drive source 32 is supported in the rear part of the vehicle 10.

The drive operation mechanism is a mechanism for receiving a drive operation of a driver, and includes a steering wheel 34 and a pedal not shown in the diagrams. The driver operates the steering wheel 34, thereby being able to rotate the front wheels 30F around the steering axis. The driver operates the pedal, thereby being able to perform an acceleration operation and a brake operation. The steering wheel 34 and the pedal are located in front of the seat 26. The driver seated in the seat 26 can operate the steering wheel 34 and the pedal. It is applicable that the pedals are an accelerator pedal and a brake pedal that are separately provided, or both the acceleration and the brake can be operated with one pedal.

The wheels 30F and 30R are supported by the vehicle body 11 via a suspension 36. The suspension 36 generally includes a suspension arm 37, a spring, and a shock absorber 38. The spring and the shock absorber 38 may be integrally formed. A component in which the spring and the shock absorber 38 are integrally formed is also referred to as a coil over, for example. The suspension 36 may be an axle suspension system (rigid type) in which the wheels on the right and left sides are integrally moved, or may also be an independent suspension system (independent type) in which the wheels on the right and left sides are independently moved. When the vehicle 10 is an off-road vehicle, the suspension 36 is preferably the independent suspension system.

The independent suspension system may be any of various types of suspension systems such as a double wishbone system, a strut system, a multilink system, or a trailing-arm system. The double wishbone system includes an upper arm and a lower arm pivotable around a wheel hub as the suspension arm 37. The strut system includes a lower arm as the suspension arm 37 and does not include an upper arm. The multilink system includes one or more arms in addition to an upper arm and a lower arm as the suspension arm 37. The trailing-arm system includes a swing arm including a swing axis (pivot). The swing arm is rigidly connected to a wheel hub.

The same suspension system may be adopted to the suspension 36 of the front wheels 30F and the suspension 36 of the rear wheels 30R. Different suspension systems may be adopted to the suspension 36 of the front wheels 30F and the suspension 36 of the rear wheels 30R. For example, it is applicable that the suspension 36 of the front wheels 30F is the double wishbone system and the suspension 36 of the rear wheels 30R is the trailing-arm system.

The suspension 36 may be an active suspension or a passive suspension. The active suspension is a suspension which can control damping force by hydraulic pressure or pneumatic pressure, for example. In this case, the vehicle 10 includes a control apparatus electrically controlling the active suspension. The active suspension may be a hydraulic pressure active suspension provided with a hydraulic pressure actuator in which hydraulic pressure can be adjusted as a shock absorber, or may also be an air suspension provided with an air chamber in which pneumatic pressure can be adjusted as a spring, for example. The passive suspension is a suspension which does not include a mechanism which can control damping force by hydraulic pressure or pneumatic pressure, for example.

A control system of the active suspension may be semi-active control or full-active control. In the semi-active control, only damping force while the vehicle is traveling is controlled. In the full-active control, a vehicle body height while the vehicle is stopping is controlled in addition to the damping force while the vehicle is traveling. The active suspension on which the full-active control can be performed functions as a vehicle body height adjustment apparatus. A control apparatus in which the full-active control is performed on the active suspension functions as a control apparatus controlling the vehicle body height adjustment apparatus. In the present embodiment, the suspension is the active suspension on which the full-active control can be performed.

The vehicle 10 includes an electronic control unit (ECU) 39 as the control apparatus, for example. The ECU 39 controls each apparatus in the vehicle 10. The number of the ECUs 39 may be one, or the plurality of ECUs 39 are also applicable. Control target apparatuses controlled by the plurality of ECUs 39 may be divided in accordance with types of apparatuses, or may also be divided in accordance with an area where the apparatuses are disposed. An arrangement position of the ECU 39 is particularly limited but can be appropriately set. Herein, the ECU 39 is disposed in a space in front of a driver seat. For example, the ECU 39 may be disposed in a space in an instrument panel, or may also be disposed in a luggage space.

<Hatch and Rack>

Figure 3:
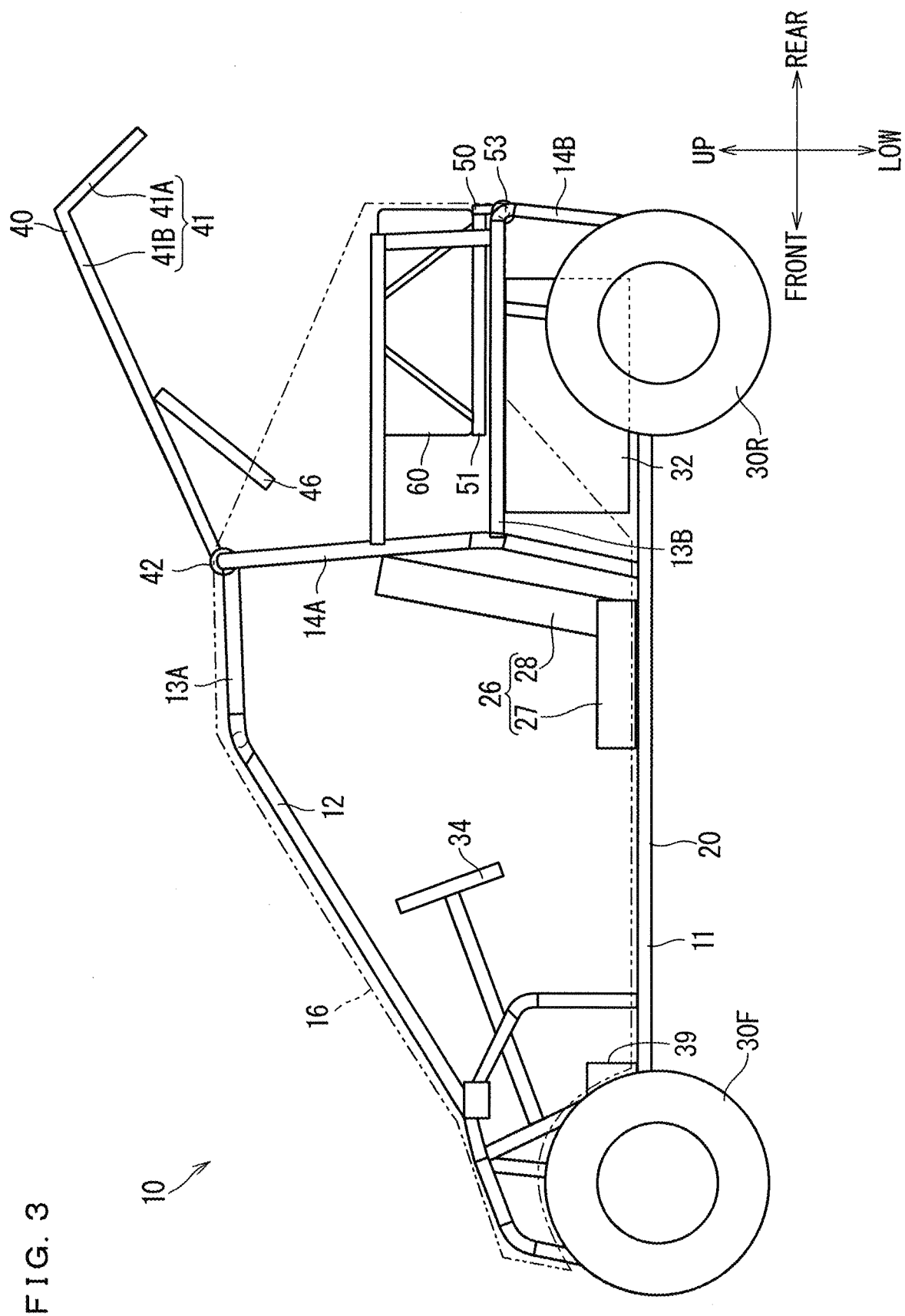
FIG. 3 is a side view illustrating a state where a hatch is developed.
Figure 4:
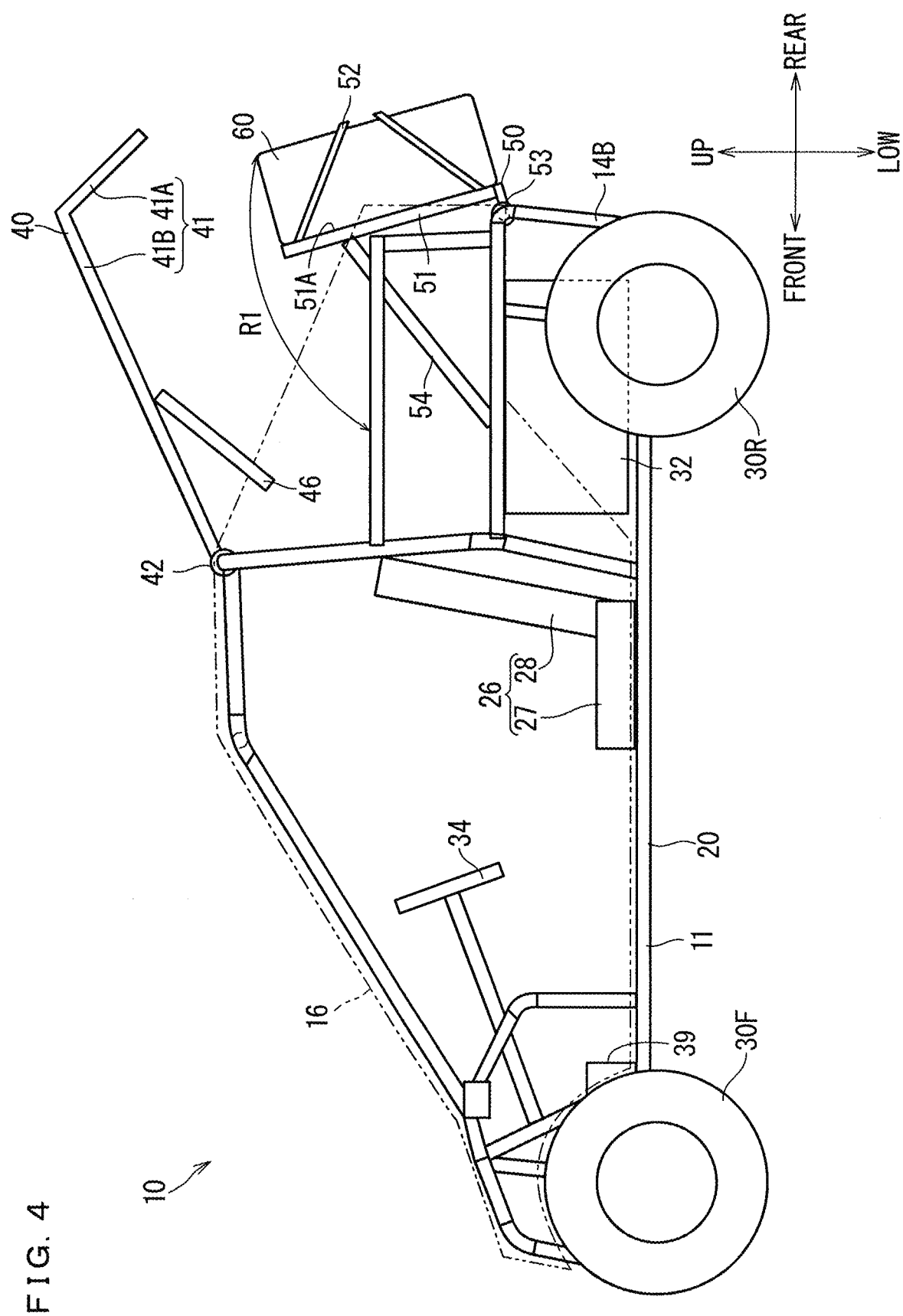
FIG. 4 is a side view illustrating a state where the hatch and a rack are developed.
Figure 5:
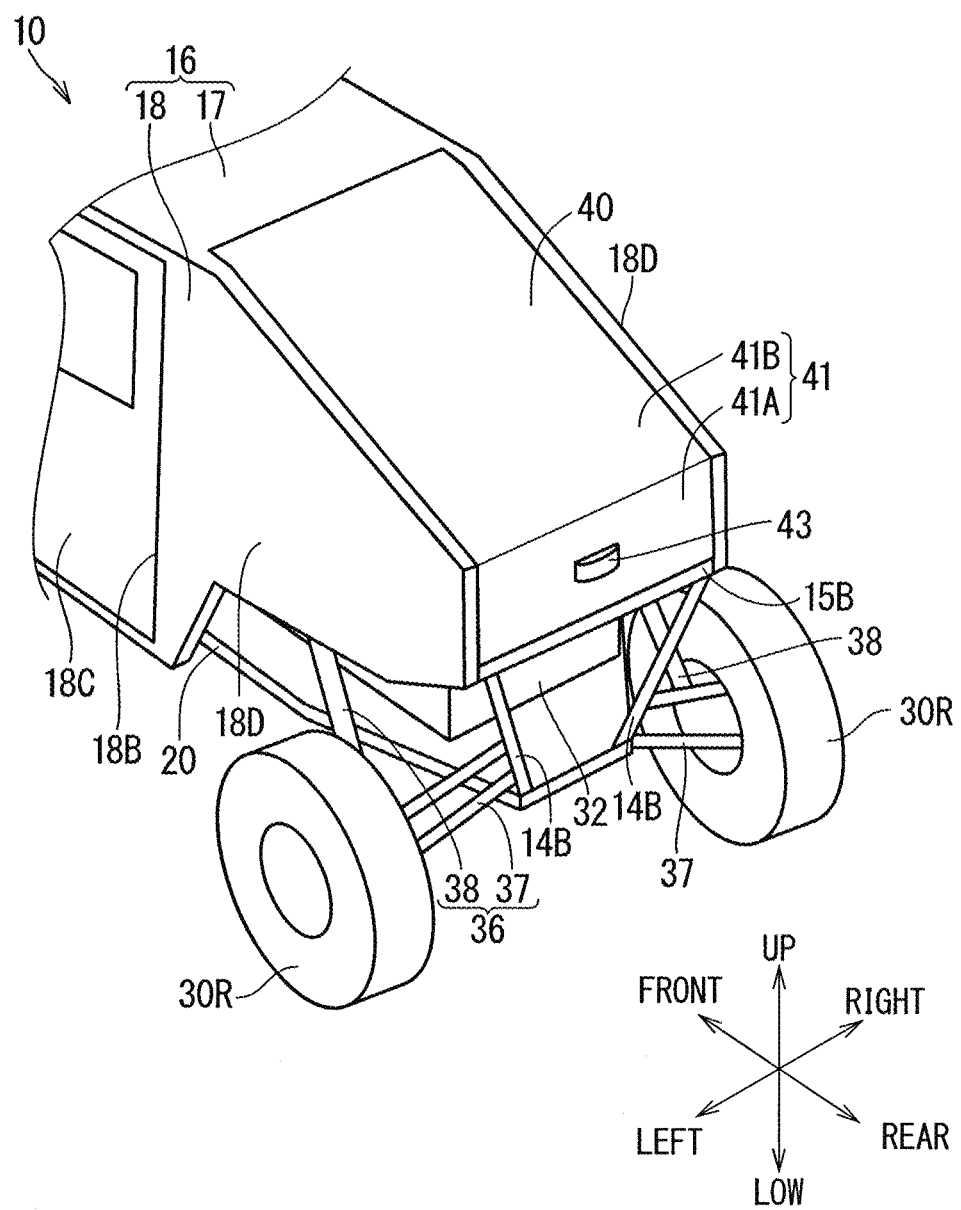
FIG. 5 is a perspective view illustrating a rear part of the vehicle.
Figure 6:
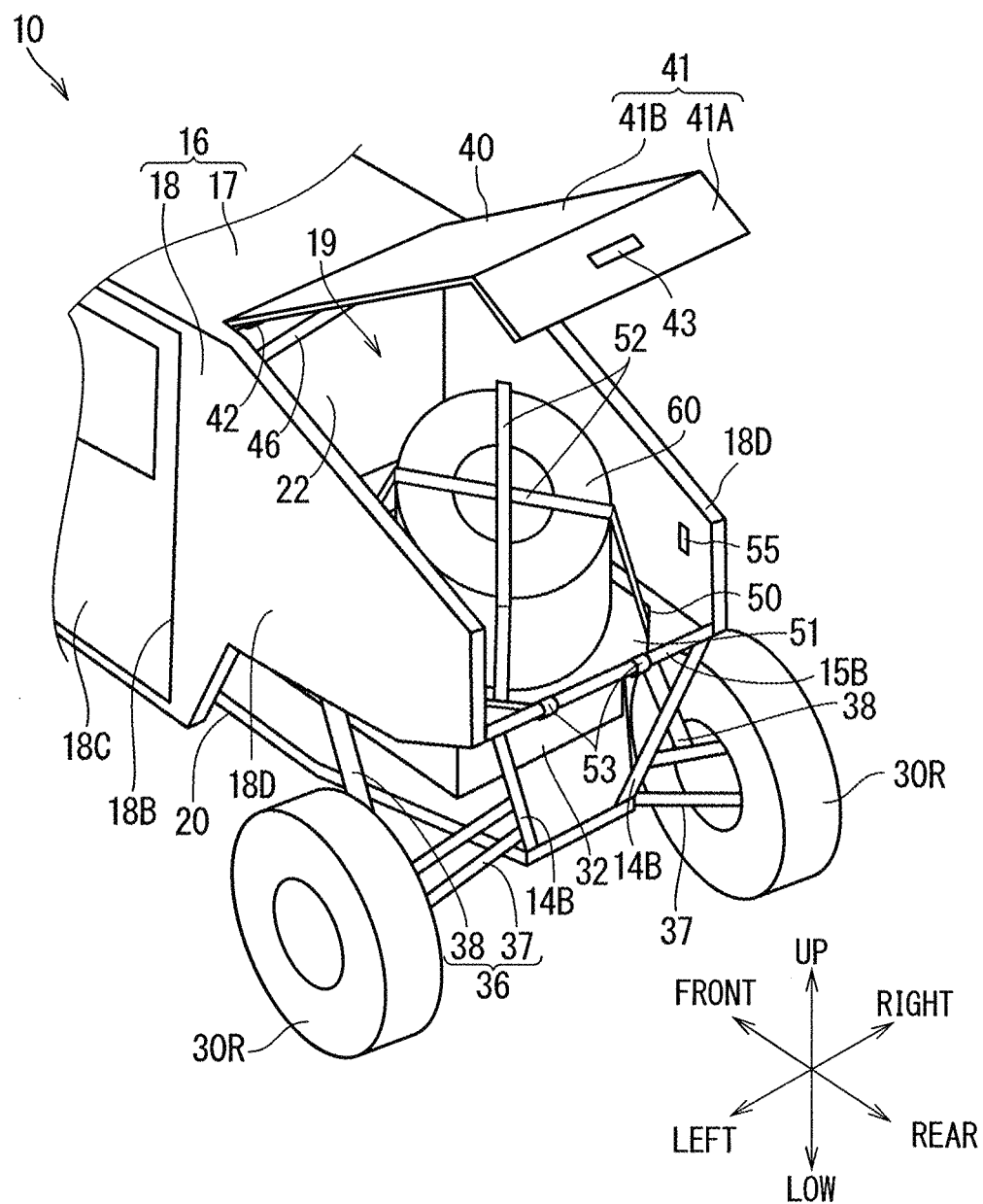
FIG. 6 is a perspective view illustrating the state where the hatch is developed.
Figure 7:
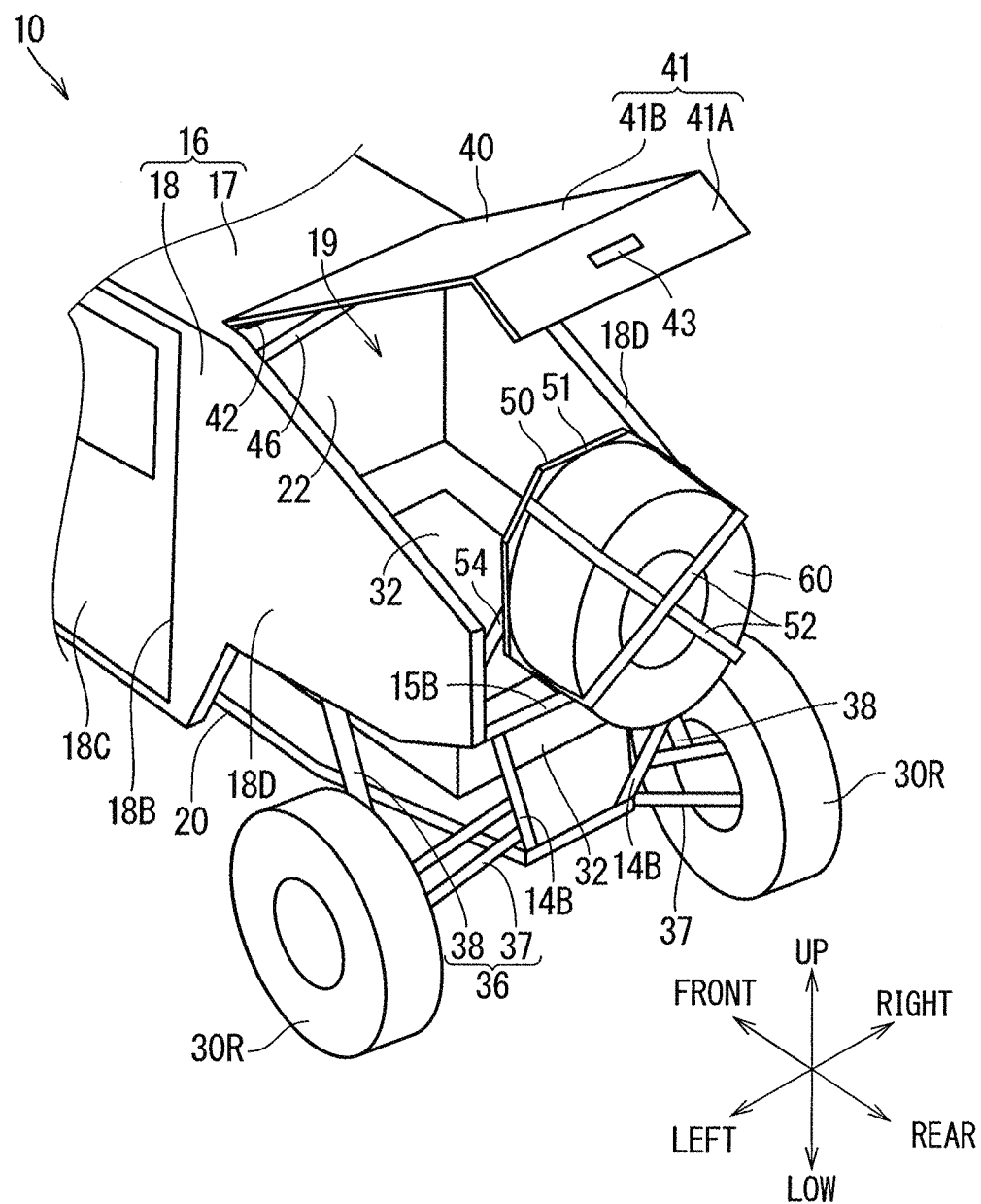
FIG. 7 is a perspective view illustrating the state where the hatch and the rack are developed.

FIG. 3 is a side view illustrating a state where the hatch 40 is developed. FIG. 4 is a side view illustrating a state where the hatch 40 and the rack 50 are developed. FIG. 5 is a perspective view illustrating a rear part of the vehicle 10. FIG. 6 is a perspective view illustrating the state where the hatch 40 is developed. FIG. 7 is a perspective view illustrating a state where the hatch 40 and the rack 50 are developed.

The hatch 40 includes a hatch body 41, a hatch hinge 42, and a hatch handle 43. Herein, the hatch 40 is supported by the ROPS 12.

The hatch body 41 includes a rear wall part 41A extending along the up-down direction and the right-left direction. Herein, the hatch body 41 includes an upper wall part 41B extending from an upper end of the rear wall part 41A toward the front-back direction. The rear wall part 41A of the hatch body 41 has a posture along the up-down direction in a close state, and changes the posture toward a posture along a horizontal direction when the hatch body 41 is opened.

The hatch hinge 42 is located in an end portion of the hatch body 41. The hatch hinge 42 is connected to the vehicle body 11. Herein, the hatch hinge 42 is located in a front end of the upper wall part 41B. The hatch hinge 42 is connected to the cross frame part 15A of the ROPS 12. The hatch hinge 42 connects the hatch body 41 to the vehicle body 11 to be rotatable around a rotation axis of the hatch 40. The rotation axis of the hatch 40 is an axis extending along the right-left direction.

The hatch handle 43 is located in a rear part of the hatch body 41. The hatch handle 43 is provided on a rear surface of the rear wall part 41A.

The hatch 40 may be openable and closable by a hatch latch and a hatch striker to which the hatch latch is locked. When the hatch latch is locked to the hatch striker, the hatch body 41 is kept in a close state. One of the hatch latch and the hatch striker is provided to the hatch 40, and the other one thereof is provided to a member which is integrally formed with the hatch 40 and is not moved. The member which is integrally formed with the hatch 40 and is not moved may be the vehicle body 11 or the rack 50. For example, it is applicable that the hatch latch is provided to a peripheral edge of the rear wall part 41A, and the hatch striker is provided to the vehicle body 11. The hatch striker may be located below a lower edge of the rear wall part 41A, for example. The hatch striker may be provided to the cross frame part 15B or a member (rack body 51, for example) supported by the cross frame part 15B, for example.

The hatch latch is opened and closed by an open-close operating element. When the open-close operating element pivots the hatch latch, a lock state on the hatch striker is released. The open-close operating element includes a latch lever connected to a shaft of the latch and an external operation mechanism operating the latch lever by an operation from outside, for example. It is applicable that the hatch latch can be operated only manually, or can be operated electrically or manually.

For example, the hatch handle 43 may have a function as an external operation mechanism. For example, it is also applicable that when the hatch handle 43 is pivotably supported by the rear wall part 41A and is pivoted, the latch lever connected to the hatch handle 43 pivots the latch, thereby being able to release the lock on the striker. The external operation mechanism may be provided separately from the hatch handle 43. For example, the external operation mechanism may include a switch such as a push button, a wiring connected to the switch, and a motor connected to the wiring to pivot the latch lever. In this case, the switch may be provided to the hatch handle 43. The switch may be provided in a position away from the hatch handle 43 such as a driver seat.

A hatch lock may be provided to the hatch 40. The hatch lock locks the hatch 40 in a close state. The hatch lock may lock the hatch latch described above. In this case, for example, the hatch lock includes a locking lever locked to the latch lever. The hatch lock may be provided separately from the hatch latch. The hatch lock includes an external operation mechanism performing a lock/release operation by an operation from outside. The external operation mechanism may include a switch such as a push button, a wiring connected to the switch, and a motor connected to the wiring to pivot the lock. In this case, the switch may be provided to the hatch handle 43. The switch may be provided in a position away from the hatch handle 43 such as a driver seat.

It is applicable that the lock/release operation of the hatch lock can be operated only manually, or can be operated electrically or manually.

For example, a component such as a door lock apparatus in which the latch, the latch lever, and the locking lever are integrally formed can be used as a component in which the hatch latch, the open-close operating element of the hatch latch, and the hatch lock are integrally formed.

As illustrated in FIG. 6, when the hatch 40 is opened, the opening part 19 is released. The hatch 40 is moved to an upper position beyond a pivot range of the rack 50 while the opening part 19 is released. The hatch 40 in the close state interferes with the pivot range of the rack 50.

The vehicle 10 includes a hatch holder holding the hatch 40 in a position where the hatch 40 is opened. The hatch holder also functions as a bias member biasing the hatch 40 to an opening direction. The vehicle 10 includes a hatch dumper 46 as the hatch holder. The hatch dumper 46 can also suppress abrupt opening and closing of the hatch 40. The hatch dumper 46 includes a cylinder housing a fluid, a piston moved in the cylinder, and a cylinder rod extending from the piston toward outside the cylinder. One of the cylinder and the cylinder rod is fixed to the hatch 40, and the other one thereof is fixed to the vehicle body 11, for example. Then, when the hatch 40 is opened and closed, a position of the piston is changed, and pressure in the cylinder is changed. For example, when the fluid is in a compressed state while the hatch 40 is in the close state, the hatch 40 is biased to the opening direction. When pressure of the fluid is applied in the movement of the piston, abrupt movement of the hatch 40 is suppressed. The hatch dumper 46 may not include a mechanism of changing the pressure in the cylinder other than the open-close operation of the hatch 40.

A luggage space is formed in a lower side of the hatch 40. An occupant space is formed in a front side of the luggage space. The luggage space is a space in which the rack 50 is provided. The occupant space is a space in which the seat is provided. Herein, the vehicle body 11 includes the partition wall 22 partitioning the luggage space and the occupant space. The partition wall 22 extends along the up-down direction and the right-left direction in the rear part of the seat 26. The partition wall 22 may not be provided.

The rack 50 includes the rack body 51 and a rack hinge 53.

The rack body 51 includes a mounting surface 51A to which a stored object 60 is mounted. The mounting surface 51A of the rack body 51 has a posture along the horizontal direction in the first position, and has a posture along the vertical direction when the mounting surface 51A is moved toward the second position. A position illustrated in FIG. 4 is the second position herein.

The rack hinge 53 is located in an end portion of the rack body 51. The rack hinge 53 is connected to the vehicle body 11. Herein, the rack hinge 53 is located in a rear end of the rack body 51. The rack hinge 53 is connected to the cross frame part 15B of the ROPS 12. The rack hinge 53 connects the rack body 51 to the vehicle body 11 to be rotatable around a rotation axis of the rack 50. The rotation axis of the rack 50 is an axis extending along the right-left direction.

The rack 50 may have a horizontal posture of being further rotated at substantially 90 degrees from the position illustrated in FIG. 4 so that a surface thereof on a side opposite to the mounting surface 51A is directed to the upper side, for example. The rack 50 may have a vertical posture of being further rotated at substantially 180 degrees from the position illustrated in FIG. 4 so that the mounting surface 51A is directed to the front side. The rack 50 may be configured to be able to be positioned at a third position between the first position and the second position.

Herein, the rack 50 is a tire rack 50 to which a spare tire 60 is mounted. The tire rack 50 can be moved between the first position and the second position while the spare tire 60 is mounted thereto.

The rack 50 may include a fixing component 52 attached to the rack body 51 to fix the stored object 60. Herein, a fixing belt is provided to the rack 50 as the fixing component 52 to fix the spare tire 60.

The rack 50 may be the rack 50 other than the tire rack 50. For example, a cool box or a luggage loading box may be mounted to the rack 50.

A range R1 illustrated in FIG. 4 is a pivot range of the spare tire 60 mounted to the rack 50 between the first position and the second position. Herein, the hatch 40 is moved to the upper side beyond the range R1 while the opening part 19 is released. The range R1 interferes with the hatch 40 in the close state.

The vehicle 10 may include a movement mechanism 54 of moving the rack 50 between the first position and the second position. The movement mechanism 54 may be a cylinder device, for example. The cylinder device includes a cylinder housing a fluid, a piston moved in the cylinder, a cylinder rod extending from the piston toward outside the cylinder, and a mechanism changing pressure in the cylinder, for example. One of the cylinder and the cylinder rod is fixed to the rack 50, and the other one thereof is fixed to the vehicle body 11, for example. Then, when pressure in the cylinder is changed, a position of the piston is changed, and the rack 50 is moved. The cylinder device also functions as a rack holder holding the rack 50 in a position where the rack 50 is opened.

The vehicle 10 may not include the movement mechanism 54 of moving the rack 50 between the first position and the second position. In this case, the rack 50 is moved by manpower. In this case, it is sufficient that a rack handle for a person to grip the rack 50 is provided to the rack body 51. In this case, it is sufficient that a rack dumper is provided. The rack dumper includes a cylinder, a piston, and a cylinder rod in the manner similar to the hatch dumper 46 described above, and does not include a mechanism of changing pressure in the cylinder. The rack dumper functions as a rack holder holding the rack 50 in the second position. The rack dumper also functions as a bias member biasing the rack 50 to the second position. The rack dumper can suppress abrupt movement of the rack 50.

The vehicle 10 includes an operating element 55 performing an open-close operation on the rack 50. The operating element 55 is located inside the vehicle 10 with respect to the hatch 40 in the close state. As illustrated in FIG. 6, the operating element 55 is provided on an inner surface of the rear sidewall part 18D. The operating element 55 may be provided to an inner surface of the hatch body 41 or a rear surface of the partition wall 22. For example, when the operating element 55 is operated, the mechanism of changing the pressure in the cylinder in the cylinder device described above is actuated, and the rack 50 is opened and closed.

The under-hatch component 32 is located below the rack 50. The under-hatch component 32 may include a component relating to a travel mechanism such as the travel drive source 32, an oil filter, a battery, or an air cleaner. Herein, the travel drive source 32 constitutes the under-hatch component 32. The travel drive source 32 may be an engine (internal combustion engine) or an electrical motor.

The under-hatch component 32 may include a maintenance target component, for example. The maintenance target component is a component which requires regular maintenance or a component which has a high maintenance frequency, for example. For example, the component relating to the travel mechanism such as the travel drive source 32, the oil filter, the battery, and the air cleaner described above is considered the maintenance target component. It is easy to have access to the maintenance target component, thus maintenance properties of the maintenance target component are improved. It is sufficient that a maintenance target part of the maintenance target component is provided in an accessible position through the opening part 19.

When the under-hatch component 32 includes the maintenance target component, it is applicable that the rack 50 can retract to a position which does not interfere with a maintenance operation of the maintenance target component, or can be detached from the vehicle body 11.

The under-hatch component 32 may include a plurality of components. A component having high design properties in the plurality of components may be provided in a position exposed more easily than a component having low design properties. A component having high maintenance properties in the plurality of components may be provided in a position exposed more easily than a component having low maintenance properties.

The under-hatch component 32 may be exposed from a position other than the opening part 19. For example, the under-hatch component 32 may be exposed from a position between the lower part of the rear sidewall part 18D and the chassis 20.

<Control of Vehicle Body Height>

Figure 8:
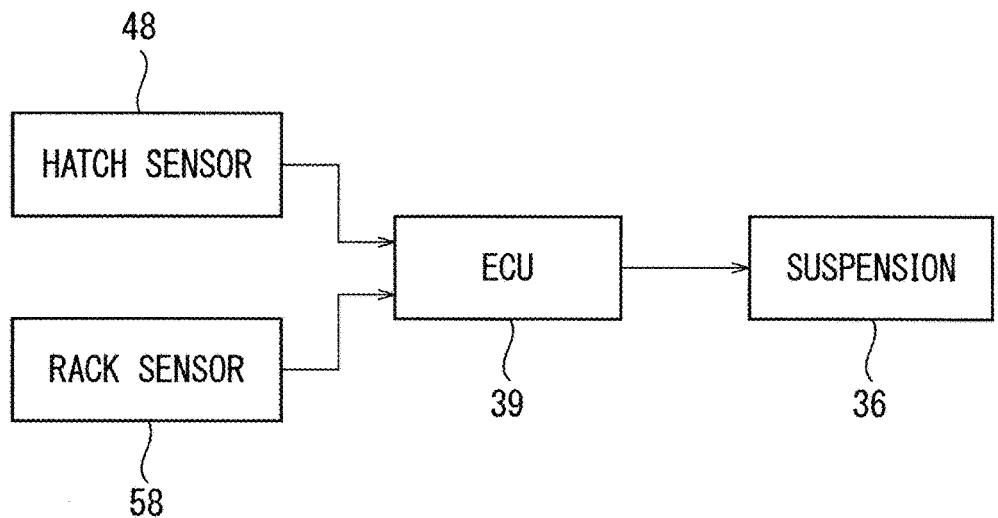
FIG. 8 is a block diagram illustrating an apparatus configuration of the vehicle.

FIG. 8 is a block diagram illustrating an apparatus configuration of the vehicle 10.

The vehicle 10 includes a hatch sensor 48, a rack sensor 58, a vehicle body height adjustment apparatus 36, and a control apparatus 39. The hatch sensor 48 detects rotation of the hatch 40. The rack sensor 58 may detect rotation of the rack 50. The rack sensor 58 may detect inclination of the rack 50 with respect to the vehicle body 11 or horizon. The rack sensor 58 may include a sensor detecting the rotation of the rack 50 and a sensor detecting the inclination of the rack 50 with respect to the vehicle body 11 or horizon. The vehicle body height adjustment apparatus 36 adjusts a height of the vehicle body 11. The control apparatus 39 controls the vehicle body height adjustment apparatus 36. Herein, the active suspension 36 described above functions as the vehicle body height adjustment apparatus 36. The vehicle body height adjustment apparatus 36 may be made as a mechanism different from the suspension 36. Herein, the ECU 39 functions as the control apparatus 39 controlling the vehicle body height adjustment apparatus 36.

A detection result of the hatch sensor 48 and a detection result of the rack sensor 58 are transmitted to the ECU 39. The ECU 39 controls the vehicle body height adjustment apparatus 36 based on the detection result of the hatch sensor 48 and/or the detection result of the rack sensor 58. The vehicle body height adjustment apparatus 36 is a hydraulic type apparatus or a pneumatic type apparatus, and the vehicle body 11 can be moved up and down by adjusting hydraulic pressure or pneumatic pressure. Herein, the active suspension 36 provided to each of four wheels functions as the vehicle body height adjustment apparatus 36. Accordingly, the vehicle body 11 can be moved up and down independently in a position corresponding to each of four wheels regardless of the other position.

The vehicle body height adjustment may be inclination of the vehicle body 11 or moving up and down of the vehicle body 11 in a horizontal posture without inclination thereof. When the vehicle body 11 is inclined, the vehicle body 11 may be inclined so that heights of the front part and the rear part are different from each other. In this case, when the rear part is lower in height than the front part, the stored object 60 can be taken in and out from the rack 50. When the vehicle body 11 is inclined, the vehicle body 11 may be inclined in a rolling direction. That is to say, the vehicle body 11 may be inclined so that heights of a right part and a left part of the vehicle 10 are different from each other. In this case, the under-hatch component 32 can be easily seen.

Figure 9:
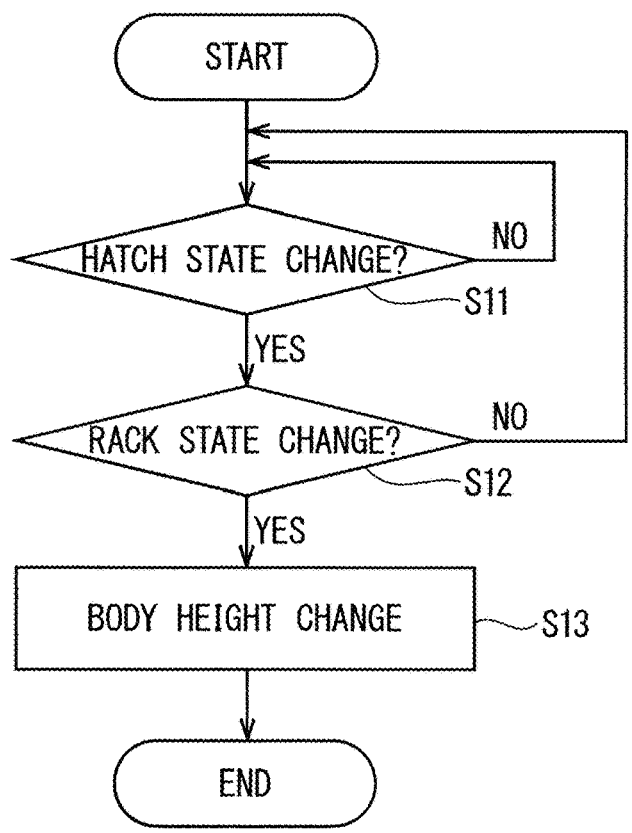
FIG. 9 is a flow chart illustrating an example of a control operation of an ECU.

FIG. 9 is a flow chart illustrating an example of a control operation of the ECU 39. In the example illustrated in FIG. 9, the ECU 39 controls the vehicle body height adjustment apparatus 36 based on both a state of the hatch 40 and a state of the rack 50.

In Step S11, the ECU 39 determines whether the open-close state of the hatch 40 is changed based on the detection result of the hatch sensor 48. When it is determined that the open-close state of the hatch 40 is changed, the process proceeds to Step S12.

In Step S12, the ECU 39 determines whether the open-close state of the rack 50 is changed based on the detection result of the rack sensor 58. When it is determined that the open-close state of the rack 50 is changed, the process proceeds to Step S13.

In Step S13, the ECU 39 controls the vehicle body height adjustment apparatus 36 to change the vehicle body height. The changed vehicle body height is preset based on the state of the hatch 40 or the state of the rack 50.

For example, when it is determined in Step S11 and Step S12 that both the hatch 40 and the rack 50 are changed in the opening direction, the ECU 39 may control the vehicle body height adjustment apparatus 36 so that the vehicle body height gets lower in Step S13. For example, when it is determined in Step S11 and Step S12 that both the hatch 40 and the rack 50 are changed in a closing direction, the ECU 39 may control the vehicle body height adjustment apparatus 36 so that the vehicle body height gets higher in Step S13.

Figure 10:
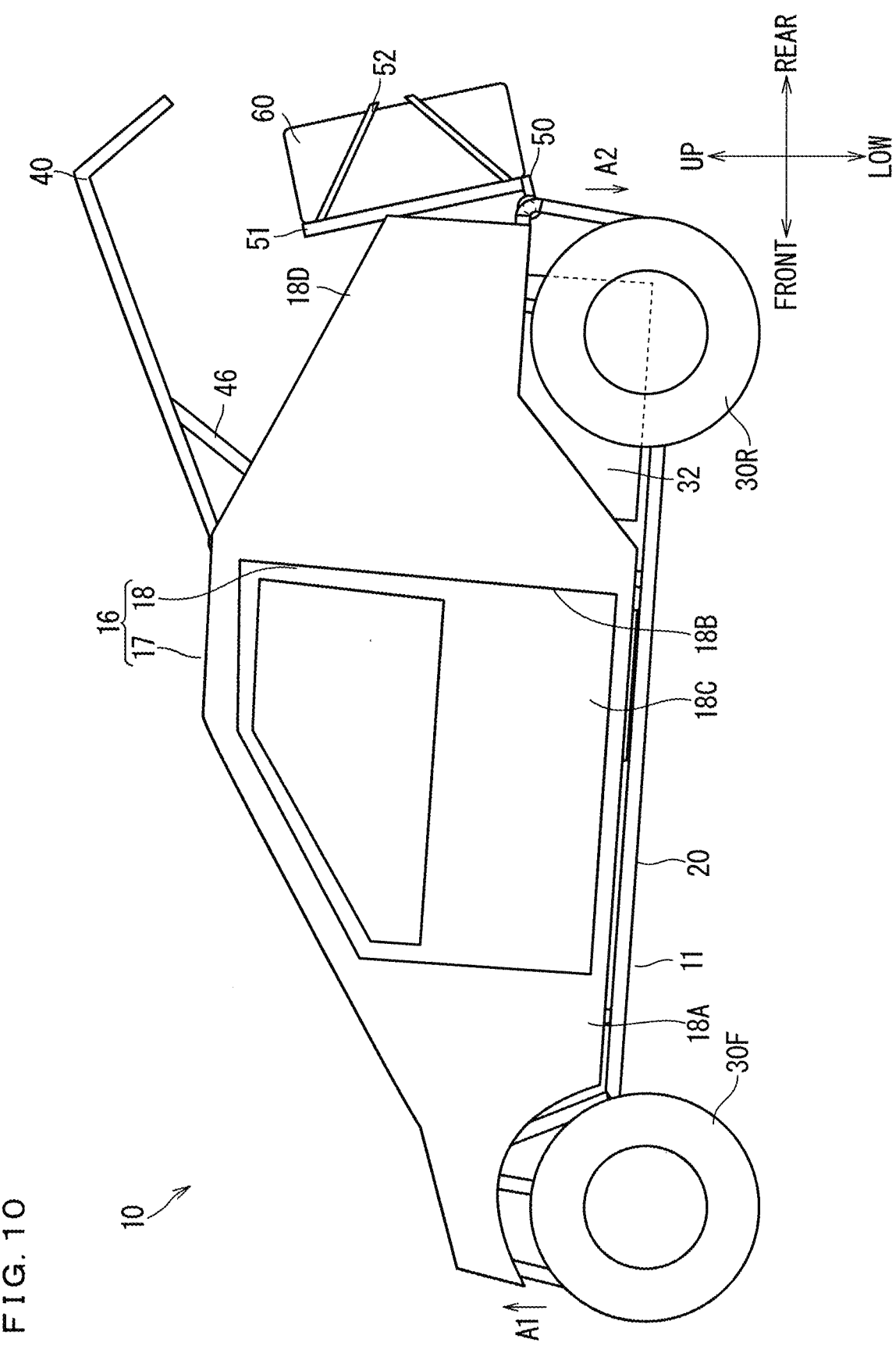
FIG. 10 is a side view illustrating a vehicle in which a vehicle body height is adjusted.

FIG. 10 is a side view illustrating the vehicle 10 in which the vehicle body height is adjusted. FIG. 10 illustrates an example indicating an adjustment result of the vehicle body height in a case where it is determined that both the hatch 40 and the rack 50 are changed in the opening direction in Step S11 and Step S12.

In the example illustrated in FIG. 10, the suspension 36 in the front part of the vehicle body 11 extends in a direction of an arrow mark A1, and the suspension 36 in the rear part of the vehicle body 11 shrinks in a direction of an arrow mark A2. Accordingly, the vehicle body height is adjusted so that the front part is moved up and the rear part is moved down. The rear part of the vehicle body 11 where the rack 50 and the under-hatch component 32 are located is moved down, thus it is easy to have access to the stored object 60 mounted to the rack 50 or the under-hatch component 32. The opening part 19 is also moved down, thus the under-hatch component 32 can be easily observed through the opening part 19.

For example, when it is determined in Step S11 and Step S12 that both the hatch 40 and the rack 50 are changed in the closing direction, the ECU 39 may change the vehicle body height from the state in FIG. 10 to the state in FIG. 1.

Figure 11:
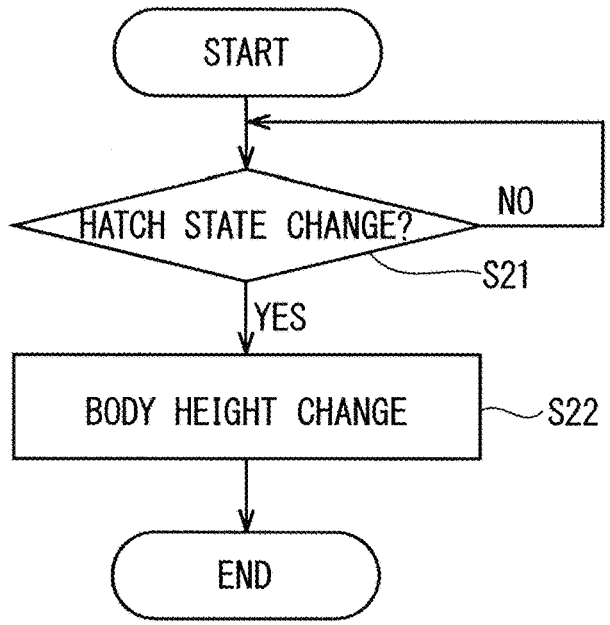
FIG. 11 is a flow chart illustrating another example of the control operation of the ECU.

FIG. 11 is a flow chart illustrating another example of the control operation of the ECU 39. In the example illustrated in FIG. 11, the ECU 39 controls the vehicle body height adjustment apparatus 36 based on the state of the hatch 40.

In Step S21, the ECU 39 determines whether the open-close state of the hatch 40 is changed based on the detection result of the hatch sensor 48. When it is determined that the open-close state of the hatch 40 is changed, the process proceeds to Step S22.

In Step S22, the ECU 39 controls the vehicle body height adjustment apparatus 36 to change the vehicle body height. The change of the vehicle body height in Step S22 may be any change described in Step S13. The control apparatus may lower the height of the vehicle body 11 upon determining that the hatch 40 is opened.

Figure 12:
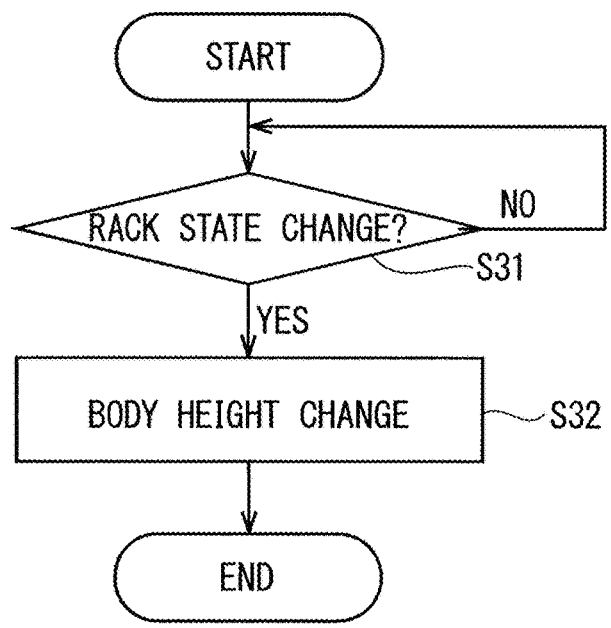
FIG. 12 is a flow chart illustrating still another example of the control operation of the ECU.

FIG. 12 is a flow chart illustrating still another example of the control operation of the ECU 39. In the example illustrated in FIG. 12, the ECU 39 controls the vehicle body height adjustment apparatus 36 based on the state of the rack 50.

In Step S31, the ECU 39 determines whether the open-close state of the rack 50 is changed based on the detection result of the rack sensor 58. When it is determined that the open-close state of the rack 50 is changed, the process proceeds to Step S32.

In Step S32, the ECU 39 controls the vehicle body height adjustment apparatus 36 to change the vehicle body height. The change of the vehicle body height in Step S32 may be any change described in Step S13. The control apparatus may lower the height of the vehicle body 11 upon determining that the rack 50 is inclined with respect to the vehicle body 11.

The control apparatus may adjust the vehicle body height based on the state of the vehicle 10 regarding the rack 50. The state of the vehicle 10 regarding the rack 50 may include any one or some of the opening of the rack 50, the opening of the hatch 40, and the inclination of the rack 50. Applicable as the adjustment of the vehicle body height is not only the case where the stored object 60 can be easily taken in and out but also a case where the posture of the rack 50 is set to get close to the horizontal posture so that the stored object 60 does not drop out even when the vehicle body 11 is inclined due to a concave-convex shape of a road surface.

<Lock Control of Rack 50>

Figure 13:
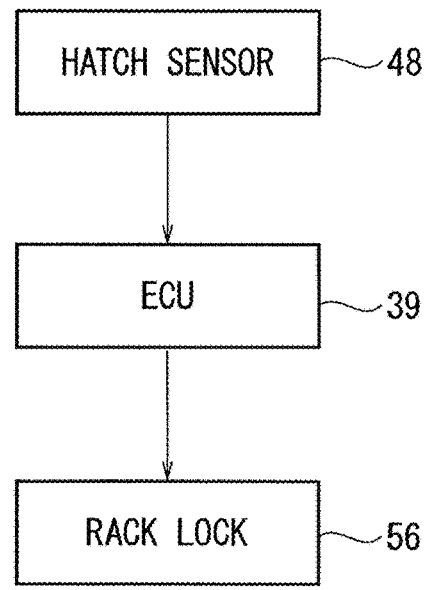
FIG. 13 is a block diagram illustrating an apparatus configuration of the vehicle.

FIG. 13 is a block diagram illustrating an apparatus configuration of the vehicle 10.

The vehicle 10 includes the hatch sensor 48 described above, a rack lock 56, and the control apparatus 39. The hatch sensor 48 detects the rotation of the hatch 40 (release state of the hatch 40). The rack lock 56 is configured to be able to switch lock and lock release of the rack 50. For example, a position of the rack 50 where the lock and lock release are performed on the rack lock 56 may be the first position, the second position, and an intermediate position between the first position and the second position. The control apparatus 39 controls the rack lock 56. Herein, the ECU 39 described above functions as the control apparatus 39 controlling the rack lock 56.

A detection result of the hatch sensor 48 is transmitted to the ECU 39. The ECU 39 switches lock and lock release of the rack lock 56 based on the detection result of the hatch sensor 48. For example, the ECU 39 releases the rack lock 56 to allow the rack 50 to move from the first position to the second position upon determining the release state of the hatch 40.

Figure 14:
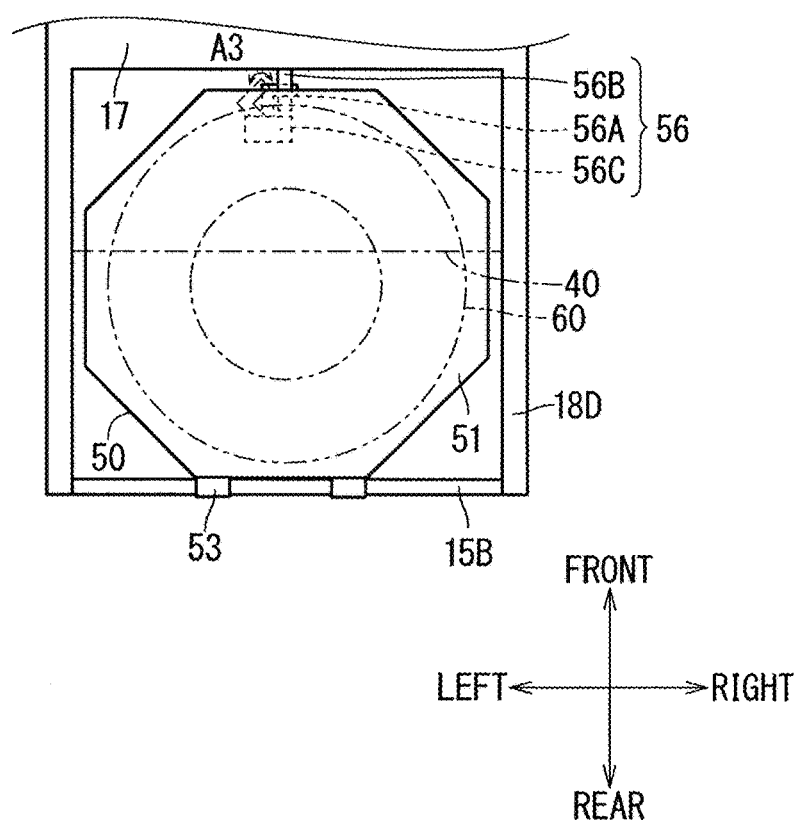
FIG. 14 is a plan view illustrating a lock/release state of a rack lock.

FIG. 14 is a plan view illustrating the lock/release state of the rack lock 56.

As illustrated in FIG. 14, the rack lock 56 includes a latch 56A, a striker 56B, and a pivoting part 56C. One of the latch 56A and the striker 56B is provided to the rack body 51, and the other one thereof is provided to a side of the vehicle body 11. The other one thereof may be provided to the partition wall 22, or may also be provided to the ROPS 12, for example. The pivoting part 56C pivots the latch 56A in a direction of an arrow mark A3. Accordingly, the state of the latch 56A is changed between a state of being locked to the striker 56B and a state of being detached from the striker 56B. The pivoting part 56C is a motor, for example.

Figure 15:
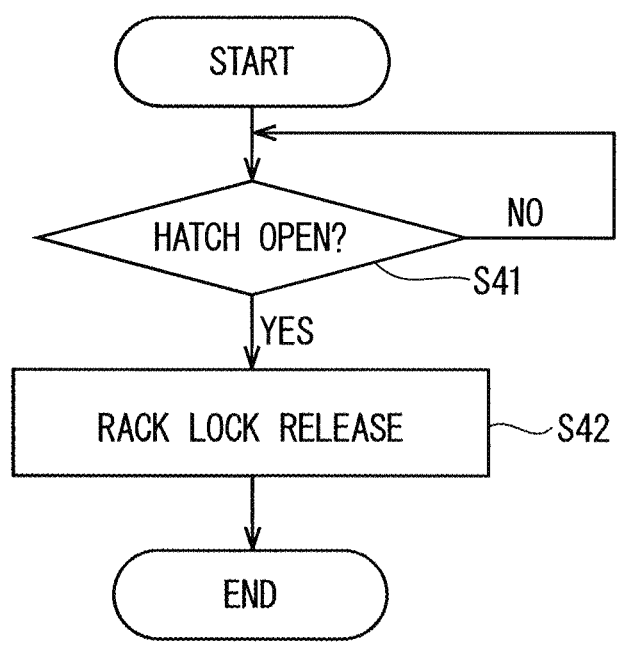
FIG. 15 is a flow chart illustrating an example of a control operation of an ECU.

FIG. 15 is a flow chart illustrating an example of a control operation of the ECU 39.

In Step S41, the ECU 39 determines whether the hatch 40 is opened based on the detection result of the hatch sensor 48. When it is determined that the hatch 40 is opened, the process proceeds to Step S42.

In Step S42, the ECU 39 controls the rack lock 56 and releases the rack lock 56. Accordingly, the rack 50 can be moved from the first position to the second position.

The vehicle 10 may include a load sensor detecting a load of the stored object 60 in the rack 50. The ECU 39 may perform control so that the rack lock 56 is kept in the lock state when the load sensor detects the load of the stored object 60 in the rack 50, and the lock of the rack lock 56 is released when the load sensor does not detect the load of the stored object 60 in the rack 50. Accordingly, dropping of the stored object 60 can be suppressed when the rack 50 is rotated.

The vehicle 10 may include a sensor detecting an attachment state of the fixing component 52 in addition to the load sensor. In this case, when the load sensor detects the load of the stored object 60 in the rack 50 and also detects that the fixing component 52 is not attached, the ECU 39 may control so that the rack lock 56 is kept in the lock state. The ECU 39 may perform control so that the lock of the rack lock 56 is released when the load sensor does not detect the load of the stored object 60 in the rack 50. The ECU 39 may perform control so that the lock of the rack lock 56 is released when the load sensor detects the load of the stored object 60 in the rack 50 and also detects that the fixing component 52 is attached. Accordingly, the rack 50 can be rotated more safely when the spare tire 60 is mounted to the tire rack 50 described above, for example.

<Operating Element 55>

Figure 16:
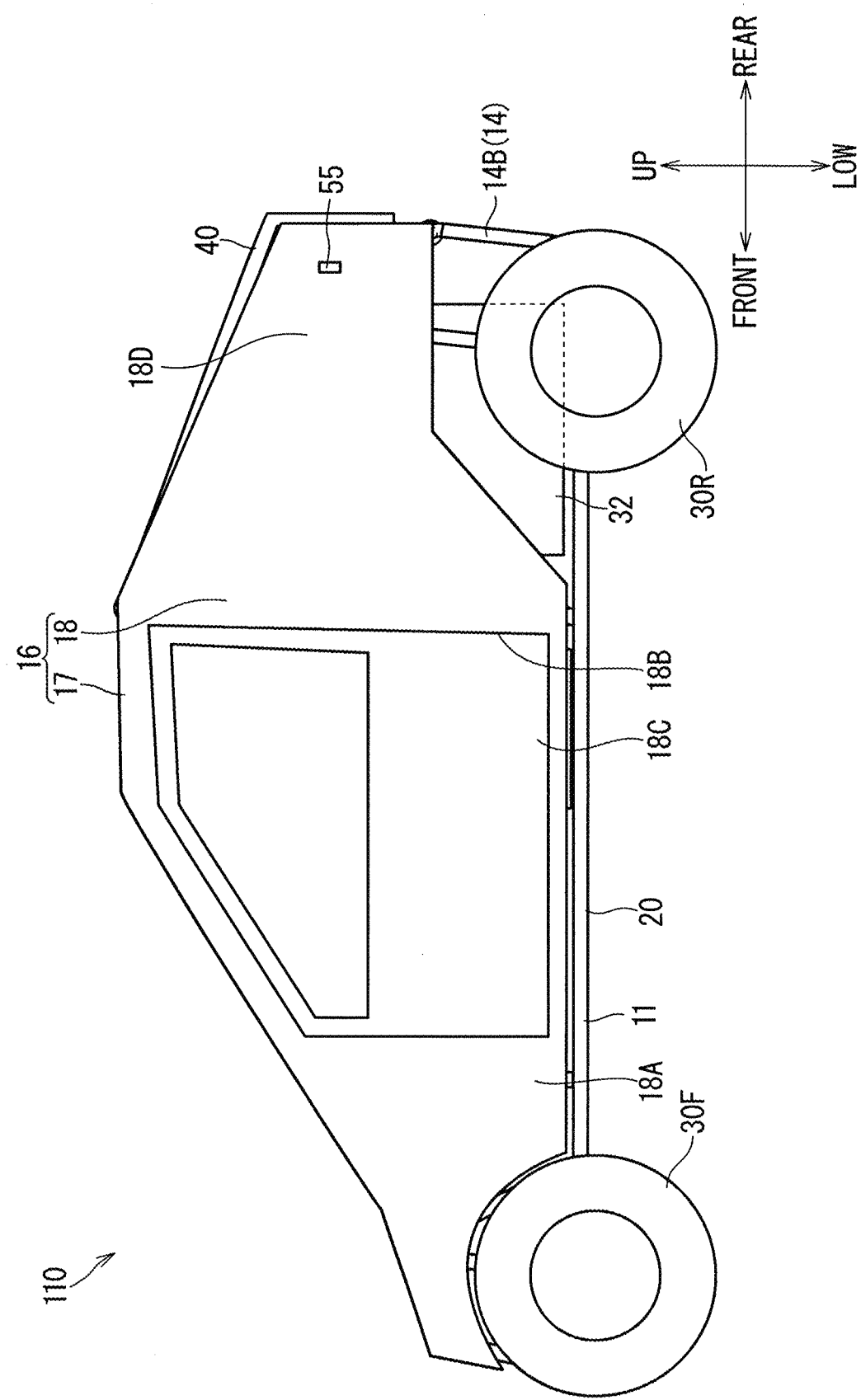
FIG. 16 is a side view illustrating a modification example of a position of an operating element.

FIG. 16 is a side view illustrating a modification example of a position of the operating element 55. As illustrated in FIG. 16, the operating element 55 performing the open-close operation on the rack 50 may be located on an upper side of the rear wheels 30R.

In addition, the operating element 55 opening and closing the hatch 40 may also be provided. Both opening and closing of the hatch 40 and rotation of the rack 50 may be performed by operation of one operating element 55.

<Vehicle Body 11>

Figure 17:
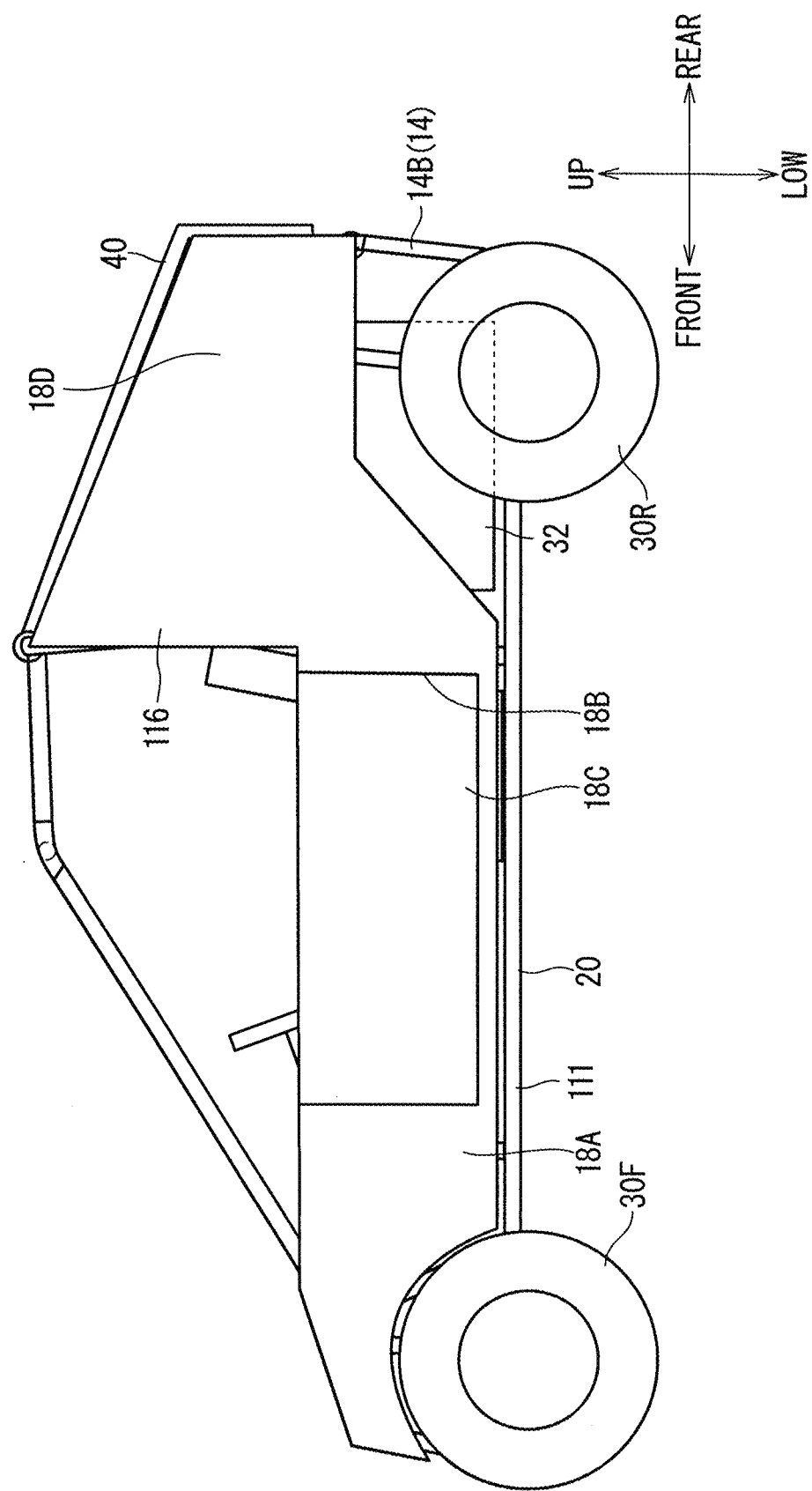
FIG. 17 is a side view illustrating a modification example of a vehicle body.

FIG. 17 is a side view illustrating a modification example of the vehicle body 11.

As illustrated in FIG. 17, a vehicle body 111 may not include the hardtop 16. In the example illustrated in FIG. 17, the vehicle body 111 includes a hard cover 116 in place of the hardtop 16 described above. In the hard cover 116, the roof part 17 is omitted in the hardtop 16 described above. In the hard cover 116, an upper part of the front sidewall part 18A is omitted in the hardtop 16 described above.

The vehicle body may not also include the hard cover. The vehicle body may include a soft-top covering a region similar to the hardtop 16. The vehicle body may include a soft cover covering a region similar to the hard cover. The vehicle body may not also include the cover covering the ROPS 12.

According to the vehicles 10 and 110 having the above configurations, the rack 50 is covered by the hatch 40, thus the stored object 60 stored in the rack 50 can be protected from rain water, for example. In a state where the hatch 40 is closed and the rack 50 is located in the first position, the under-hatch component 32 can be protected by the rack 50 and the hatch 40, and the stored object 60 loaded on the rack 50 can be protected by the hatch 40. Furthermore, in the state where the hatch 40 is opened and the rack 50 is located in the second position, it is easy to have access to the under-hatch component 32 through the opening part 19.

The under-hatch component 32 is the travel drive source 32. The travel drive source 32 is a component requiring improvement of appearance or maintenance by exposure. The travel drive source 32 is exposed, thus maintenance properties of the travel drive source 32 are improved, and visuality of the design of the travel drive source 32 can be improved.

The hatch 40 includes the hatch handle 43. Accordingly, the open-close operation of the hatch body 41 can be easily performed by the handle.

The rack hinge 53 is located in the rear end of the rack body 51. Accordingly, the second position of the rack 50 is located outside the vehicle 10.

The hatch hinge 42 is located in a front end of the hatch body 41, and the rack hinge 53 is located in the rear end of the rack body 51. The hatch 40 and the rack 50 can be rotated in directions opposite to each other, thus hardly interfere with each other compared with a case where they are rotated in the same direction.

The hatch 40 is moved to the upper position beyond the pivot range of the rack 50 while the opening part 19 is released. Thus, the interference between the hatch 40 and the rack 50 is prevented, and the rack 50 can be sufficiently inclined.

The vehicle body 11 includes the partition wall 22 partitioning the luggage space in which the rack 50 is provided and the occupant space in which the seat 26 is provided. Accordingly, transfer of heat between the luggage space and the occupant space can be suppressed.

The rack 50 is the tire rack 50 to which the spare tire 60 is mounted. The tire rack 50 can cover the under-hatch component 32.

The tire rack 50 can be moved between the first position and the second position while the spare tire 60 is mounted thereto. The spare tire 60 can be mounted to and taken out from the tire rack 50 in the second position, thus the spare tire 60 can be easily mounted and taken out.

The vehicle 10 includes the vehicle body height adjustment apparatus 36 adjusting the height of the vehicle body 11, and detects the rotation of the hatch 40, thus the vehicle body height adjustment apparatus 36 adjusts the height of the vehicle body 11. Accordingly, the vehicle body height can be automatically changed when the hatch 40 is rotated.

The vehicle 10 includes the operating element 55 performing the open-close operation on the rack 50, and the operating element 55 is located inside the vehicle 10 with respect to the hatch 40 in the close state. Suppressed accordingly is the operation of the operating element 55 while the hatch 40 is not opened.

The operating element 55 performing the open-close operation on the rack 50 is located on the upper side of the rear wheels 30R in the vehicle 110. Accordingly, the operating element 55 can be operated even when the user does not approach the lateral side of the vehicle 10.

The vehicle 10 includes the hatch holder 46 holding the hatch 40 in the position where the hatch 40 is opened. Accordingly, the hatch 40 can be held in the open state.

The vehicle 10 includes the rack holder 54 holding the rack 50 in the second position. Accordingly, the rack 50 can be held in a state of being located in the second position.

The hatch 40 is supported by the ROPS 12. Accordingly, the hatch 40 is easily protected by the ROPS 12.

The hatch hinge 42 is connected to the ROPS 12. Accordingly, the hatch 40 is easily supported by the ROPS 12.

The rack hinge 53 is connected to the ROPS 12. Accordingly, the rack 50 is easily supported by the ROPS 12.

The vehicle 10 includes the hatch sensor 48 determining the release state of the hatch 40 and the rack lock 56 allowing the rack 50 to move from the first position to the second position when the sensor 48 determines the release state of the hatch 40. Accordingly, movement of the rack 50 from the first position to the second position can be suppressed while the hatch 40 is in the close state.

The control apparatus may control the vehicle body height adjustment apparatus 36 based on the state of the vehicle 10 regarding the rack 50 to adjust the height of the vehicle body 11. In this case, the vehicle body height adjustment apparatus 36 is controlled based on the state of the vehicle 10 regarding the rack 50 and the height of the vehicle body 11 is adjusted, thus the stored object 60 can be easily taken in and out from the rack 50, and can be stored in an appropriate state in the rack 50.

The control apparatus 39 may lower the height of the vehicle body 11 upon determining that the rack 50 is inclined with respect to the vehicle body 11. Accordingly, movement of the rack 50 from the first position to the second position can be suppressed while the hatch 40 is in the close state.

This application discloses the following aspects.

A first aspect is a vehicle including: a vehicle body including an opening part located in a rear part of the vehicle; a hatch supported by the vehicle body so as to be able to open and close the opening part; an under hatch component located inside the vehicle with respect to the opening part; and a rack movably supported by the vehicle body between a first position facing the under-hatch component and a second position retracted from the first position, wherein the under-hatch component is exposed outside through the opening part in a state where the hatch is opened and the rack is located in the second position.

According to the present vehicle, the rack is covered by the hatch, thus the stored object stored in the rack can be protected from rain water, for example. In the state where the hatch is closed and the rack is located in the first position, the under-hatch component can be protected by the rack and the hatch, and the stored object loaded on the rack can be protected by the hatch. Furthermore, in the state where the hatch is opened and the rack is located in the second position, it is easy to have access to the under-hatch component through the opening part.

A second aspect is the vehicle according to the first aspect, wherein the under-hatch component is a travel drive source.

In this case, the travel drive source is the component requiring improvement of appearance or maintenance by exposure. The travel drive source is exposed, thus maintenance properties of the travel drive source are improved, and visuality of the design of the travel drive source can be improved.

A third aspect is the vehicle according to the first or second aspect, wherein the hatch includes a hatch body, a hatch hinge located in a front end of the hatch body to be connected to the vehicle body, and a hatch handle located in a rear part of the hatch body.

Accordingly, in this case, the open-close operation of the hatch body can be easily performed by the handle.

A fourth aspect is the vehicle according to any one of the first to third aspects, wherein the rack includes a rack body and a rack hinge located in a rear end of the rack body to be connected to the vehicle body.

In this case, the second position of the rack is located outside the vehicle.

A fifth aspect is the vehicle according to any one of the first to fourth aspects, wherein the hatch includes a hatch body and a hatch hinge located in a front end of the hatch body to be connected to the vehicle body, and the rack includes a rack body and a rack hinge located in a rear end of the rack body to be connected to the vehicle body.

In this case, the hatch and the rack can be rotated in directions opposite to each other, thus hardly interfere with each other compared with a case where they are rotated in the same direction.

A sixth aspect is the vehicle according to the fifth aspect, wherein the hatch is moved to an upper position beyond a pivot range of the rack while the opening part is released.

Accordingly, interference between the hatch and the rack is prevented, and the rack can be sufficiently inclined.

A seventh aspect is the vehicle according to any one of the first to sixth aspects, wherein the vehicle body includes a partition wall partitioning a luggage space in which the rack is provided and an occupant space in which a seat is provided.

Accordingly, transfer of heat between the luggage space and the occupant space can be suppressed.

An eighth aspect is the vehicle according to any one of the first to seventh aspects, wherein the rack is a tire rack to which a spare tire is mounted.

In this case, the tire rack can cover the under-hatch component.

A ninth aspect is the vehicle according to the eighth aspect, wherein the tire rack can be moved between the first position and the second position while the spare tire is mounted.

In this case, the spare tire can be mounted to and taken out from the tire rack in the second position, thus the spare tire can be easily mounted and taken out.

A tenth aspect is the vehicle according to any one of the first to ninth aspects, further including a vehicle body height adjustment apparatus adjusting a height of the vehicle body, wherein the vehicle body height adjustment apparatus adjusts the height of the vehicle body upon detecting rotation of the hatch.

Accordingly, the vehicle body height can be automatically changed when the hatch is rotated.

An eleventh aspect is the vehicle according to any one of the first to tenth aspects, further including an operating element located inside the vehicle with respect to the hatch in a close state and performing an open-close operation on the rack.

The operation of the operating element can be suppressed while the hatch is not opened.

A twelfth aspect is the vehicle according to any one of the first to eleventh aspects, further including: a front wheel and a rear wheel; and an operating element located on an upper side of the rear wheel and performing an open-close operation on the rack.

Accordingly, the operating element can be operated even when a user does not approach a lateral side of the vehicle.

A thirteenth aspect is the vehicle according to any one of the first to twelfth aspects, further including a hatch holder holding the hatch in a position where the hatch is opened.

Accordingly, the hatch can be held in the open state.

A fourteenth aspect is the vehicle according to any one of the first to thirteenth aspects, further including a rack holder holding the rack in the second position.

Accordingly, the rack can be held in a state of being located in the second position.

A fifteenth aspect is the vehicle according to any one of the first to fourteenth aspects, wherein the hatch is supported by a rollover protective structure (ROPS) determining an occupant space.

Accordingly, the hatch is easily protected by the ROPS.

A sixteenth aspect is the vehicle according to the fifteenth aspect, wherein the hatch includes a hatch body and a hatch hinge located in an end portion of the hatch body to be connected to the ROPS.

Accordingly, the hatch is easily supported by the ROPS.

A seventeenth aspect is the vehicle according to the fifteenth or sixteenth aspect, wherein the rack includes a rack body and a rack hinge located in an end portion of the rack body to be connected to the ROPS.

Accordingly, the rack can be easily supported by the ROPS.

An eighteenth aspect is the vehicle according to any one of the first to seventeenth aspects, further including: a sensor determining a release state of the hatch; and a lock mechanism of allowing the rack to move from the first position to the second position when the sensor determines the release state of the hatch.

Accordingly, movement of the rack from the first position to the second position can be suppressed while the hatch is in the close state.

A nineteenth aspect is a vehicle including: a vehicle body; a vehicle body height adjustment apparatus adjusting a height of the vehicle body; a rack provided in a rear part of the vehicle body and provided with a stored object; and a control apparatus controlling the vehicle body height adjustment apparatus based on a vehicle state regarding the rack and adjusting the height of the vehicle body.

According to the present vehicle, the vehicle body height adjustment apparatus is controlled based on the vehicle state regarding the rack and the height of the vehicle body is adjusted, thus the stored object can be easily taken in and out from the rack, and can be stored in an appropriate state in the rack.

A twentieth aspect is the vehicle according to the nineteenth aspect, wherein the control apparatus lowers the height of the vehicle body upon determining an inclination of the rack with respect to the vehicle body.

Accordingly, movement of the rack from the first position to the second position can be suppressed while the hatch is in the close state.

The foregoing description is in all aspects illustrative and does not restrict the present invention. Numerous modifications and variations that have not yet been exemplified are devised without departing from the scope of the present invention.

The invention claimed is:
1. A vehicle, comprising:
a vehicle body including an opening part located in a rear part of the vehicle;
a hatch supported by the vehicle body so as to be able to open and close the opening part;
an under hatch component located inside the vehicle with respect to the opening part; and a rack movably supported by the vehicle body between a first position facing the under-hatch component and a second position retracted from the first position, wherein the under-hatch component is a travel drive source, the rack is to be a partition wall covering an upper side of the travel drive source in a state of being in the first position, and the travel drive source is exposed outside through the opening part in a state where the hatch is opened and the rack is located in the second position.

2. The vehicle according to claim 1, wherein
the hatch includes a hatch body, a hatch hinge located in a front end of the hatch body to be connected to the vehicle body, and a hatch handle located in a rear part of the hatch body.

3. The vehicle according to claim 1, wherein
the rack includes a rack body and a rack hinge located in a rear end of the rack body to be connected to the vehicle body.

4. The vehicle according to claim 1, wherein
the hatch includes a hatch body and a hatch hinge located in a front end of the hatch body to be connected to the vehicle body, the rack includes a rack body and a rack hinge located in a rear end of the rack body to be connected to the vehicle body, and the rack hinge is behind the hatch hinge.

5. The vehicle according to claim 4, wherein
the hatch is moved to an upper position beyond a pivot range of a front end of the rack while the opening part is released.

6. The vehicle according to claim 1, wherein
the vehicle body includes a partition wall partitioning a luggage space in which the rack is provided and an occupant space in which a seat is provided.

7. The vehicle according to claim 1, wherein
the rack is a tire rack to which a spare tire is mounted, and the tire rack can be moved between the first position and the second position while the spare tire is mounted.

8. The vehicle according to claim 1, further comprising
a vehicle body height adjustment apparatus adjusting a height of the vehicle body, wherein the vehicle body height adjustment apparatus adjusts the height of the vehicle body upon detecting rotation of the hatch.

9. The vehicle according to claim 1, further comprising
an operating element located inside the vehicle with respect to the hatch in a close state and performing an open-close operation on the rack.

10. The vehicle according to claim 1, further comprising:
a front wheel and a rear wheel; and
an operating element located on an upper side of the rear wheel and performing an open-close operation on the rack.

11. The vehicle according to claim 1, further comprising
a hatch holder holding the hatch in a position where the hatch is opened.

12. The vehicle according to claim 1, wherein
the rack includes a rack body and a rack hinge located in a rear end of the rack body to be connected to the vehicle body, the vehicle further comprising a rack holder holding the rack in the second position, wherein the rack holder includes a piston connected to the rack and the vehicle body.

13. The vehicle according to claim 1, wherein
the hatch is supported by a rollover protective structure (ROPS) determining an occupant space.

14. The vehicle according to claim 13, wherein
the hatch includes a hatch body and a hatch hinge located in an end portion of the hatch body to be connected to the ROPS.

15. The vehicle according to claim 13, wherein
the rack includes a rack body and a rack hinge located in an end portion of the rack body to be connected to the ROPS.

16. The vehicle according to claim 1, further comprising:
a sensor determining a release state of the hatch; and
a lock mechanism of allowing the rack to move from the first position to the second position when the sensor determines the release state of the hatch.

* * * * *